United States Patent
Mayousse et al.

(10) Patent No.: US 10,563,313 B2
(45) Date of Patent: Feb. 18, 2020

(54) ACTIVE LAYER/MEMBRANE ARRANGEMENT FOR A HYDROGEN PRODUCTION DEVICE AND ASSEMBLY COMPRISING SAID ARRANGEMENT SUITABLE FOR A POROUS CURRENT COLLECTOR AND METHOD FOR PRODUCING THE ARRANGEMENT

(71) Applicant: COMMISSARIAT A L'ENERGIE ATOMIQUE ET AUX ENERGIES ALTERNATIVES, Paris (FR)

(72) Inventors: Eric Mayousse, Grenoble (FR); Caroline Rozain, La Tour d'Aigues (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 281 days.

(21) Appl. No.: 14/910,987

(22) PCT Filed: Jul. 16, 2014

(86) PCT No.: PCT/EP2014/065303
§ 371 (c)(1),
(2) Date: Feb. 8, 2016

(87) PCT Pub. No.: WO2015/024714
PCT Pub. Date: Feb. 26, 2015

(65) Prior Publication Data
US 2016/0186339 A1    Jun. 30, 2016

(30) Foreign Application Priority Data
Aug. 23, 2013  (FR) ...................... 13 58143

(51) Int. Cl.
C25B 13/08    (2006.01)
C25B 11/04    (2006.01)
(Continued)

(52) U.S. Cl.
CPC ................ *C25B 13/08* (2013.01); *C25B 1/10* (2013.01); *C25B 9/10* (2013.01); *C25B 11/035* (2013.01);
(Continued)

(58) Field of Classification Search
CPC .... C25B 1/02; C25B 1/04; C25B 9/06; C25B 9/08; C25B 9/10; C25B 13/00;
(Continued)

(56) References Cited

U.S. PATENT DOCUMENTS

| 5,173,215 A | 12/1992 | Clarke |
| 2006/0166074 A1* | 7/2006 | Pan ..................... H01M 4/8652 429/480 |

(Continued)

FOREIGN PATENT DOCUMENTS

| CA | 2 780 363 A1 | 7/2012 |
| FR | 2 892 233 A1 | 4/2007 |

(Continued)

OTHER PUBLICATIONS

Job et al ("Nanostructured Carbons as Platinum Catalyst Supports for Proton Exchange Membrane Fuel Cell Electrodes", Topics in Catalysis, 52, 2009, pp. 2117-2122). (Year: 2009).*

(Continued)

*Primary Examiner* — Alexander W Keeling
(74) *Attorney, Agent, or Firm* — Baker & Hostetler LLP

(57) ABSTRACT

An active layer/membrane assembly to be incorporated into a hydrogen production device comprises an active layer in contact with a membrane capable of exchanging ions, the active layer comprising catalyst particles and particles (Continued)

referred to as support particles, wherein the size of the support particles is greater than the thickness of the active layer, so that the support particles emerge from the active layer, at the surface opposite the surface in contact with the membrane. A unit comprising the assembly and a porous current collector, the assembly and the collector having a complementarity of surface finish is provided. A process for manufacturing the assembly is also provided.

10 Claims, 4 Drawing Sheets

(51) Int. Cl.
| | |
|---|---|
| *H01M 4/90* | (2006.01) |
| *H01M 8/0297* | (2016.01) |
| *H01M 8/1004* | (2016.01) |
| *H01M 8/0247* | (2016.01) |
| *C25B 11/03* | (2006.01) |
| *C25B 9/10* | (2006.01) |
| *H01M 4/88* | (2006.01) |
| *H01M 8/0232* | (2016.01) |
| *C25B 1/10* | (2006.01) |
| *H01M 8/1018* | (2016.01) |

(52) U.S. Cl.
CPC ...... *C25B 11/0426* (2013.01); *C25B 11/0447* (2013.01); *H01M 4/881* (2013.01); *H01M 4/8814* (2013.01); *H01M 4/8828* (2013.01); *H01M 4/9016* (2013.01); *H01M 4/9075* (2013.01); *H01M 8/0232* (2013.01); *H01M 8/0247* (2013.01); *H01M 8/0297* (2013.01); *H01M 8/1004* (2013.01); *H01M 2008/1095* (2013.01); *Y02E 60/366* (2013.01)

(58) Field of Classification Search
CPC ..... C25B 13/04; H01M 4/881; H01M 4/8828; H01M 4/9075; H01M 8/0232; H01M 8/1004

See application file for complete search history.

(56) References Cited

U.S. PATENT DOCUMENTS

| | | |
|---|---|---|
| 2009/0042092 A1 | 2/2009 | Martinent et al. |
| 2010/0086849 A1 | 4/2010 | Mizuno et al. |
| 2010/0297524 A1 | 11/2010 | Kamachi et al. |
| 2011/0207602 A1 | 8/2011 | Xu et al. |
| 2011/0212386 A1* | 9/2011 | Roller ................ H01M 4/8642 429/524 |
| 2013/0101896 A1 | 4/2013 | Rich et al. |
| 2013/0101902 A1 | 4/2013 | Son et al. |
| 2013/0128412 A1 | 5/2013 | Bae et al. |
| 2014/0027272 A1* | 1/2014 | Blanchet ................ C25B 9/066 204/252 |
| 2014/0144774 A1* | 5/2014 | Hirashige ................ C25B 3/04 204/252 |

FOREIGN PATENT DOCUMENTS

| | | |
|---|---|---|
| WO | 02/056404 A1 | 7/2002 |
| WO | 2013/061889 A1 | 5/2013 |

OTHER PUBLICATIONS

Aaron T. Marshall et al., "Electrocatalytic activity of IrO2—RuO2 supported on Sb-doped SnO2 nanoparticles," Electrochimica Acta 55 (2010) pp. 1978-1984.

J. Polonsky et al., "Tantalum carbide as a novel support material for anode electrocatalysts in polymer electrolyte membrane water electrolysers," International Journal of Hydrogen Energy 37, No. 3, (2012) pp. 2173-2181.

X. Wu et al., "Nano-crystalline RuxSn1-xO2 powder catalysts for oxygen evolution reaction in proton exchange membrane water electrolysers," International Journal of Hydrogen Energy 36, No. 22, (2011) pp. 14796-14804.

* cited by examiner

ACTIVE LAYER/MEMBRANE ARRANGEMENT FOR A HYDROGEN PRODUCTION DEVICE AND ASSEMBLY COMPRISING SAID ARRANGEMENT SUITABLE FOR A POROUS CURRENT COLLECTOR AND METHOD FOR PRODUCING THE ARRANGEMENT

CROSS-REFERENCE TO RELATED APPLICATIONS

This application is a National Stage of International patent application PCT/EP2014/065303, filed on Jul. 16, 2014, which claims priority to foreign French patent application No. FR 1358143, filed on Aug. 23, 2013, the disclosures of which are incorporated by reference in their entirety.

FIELD OF THE INVENTION

The field of the invention is that of devices for producing hydrogen by electrolysis of water, more particularly at low temperature with the use of a proton exchange membrane (commonly known as a PEM) in a cell such as that illustrated in FIG. 1.

BACKGROUND

More specifically, this type of cell consists of two electrodes (anode and cathode, electron conductors) which are connected to a direct current generator, and separated by an electrolyte (ion-conducting medium), which may advantageously comprise a proton exchange polymer membrane that makes it possible to not resort to a liquid electrolyte, to have a great compactness, to limit corrosion problems, and to result in substantially better performance.

Oxygen is produced at the anode by oxidation of water ($E_0$=1.23 V/SHE) and hydrogen is produced at the cathode by reduction of the proton ($E_0$=0 V/SHE). The anode materials must withstand high potentials (typically greater than 1.5 V/SHE). Noble metals such as platinum at the cathode or oxides of noble metals (iridium, ruthenium, or alloys of these metals, etc.) at the anode are generally used as electrocatalysts.

A supply of energy to the system enables the anode and cathode reactions and the production of the gases to take place.

The electrolyzer core, also referred to as a membrane electrode assembly (MEA), comprises the proton exchange membrane 20, and the two layers of electrocatalysts, as shown by the references 10 and 30 respectively at the cathode 11 and anode 31.

The objective of a PEM water electrolyzer is to have the highest possible energy efficiency. Specifically, the objective is to be able to produce the desired amounts of gas while reducing the energy consumption (generally expressed in kWh·Nm$^{-3}$). This is expressed by obtaining the lowest possible electrolysis voltage for a given current.

The components used in the electrocatalytic layers must therefore catalyze the reactions of reduction of the proton (formation of hydrogen) and of oxidation of water (formation of oxygen) that take place respectively at the cathode and at the anode.

Several problems are then identified:

the materials used must be good electron conductors in order to limit the resistance of the system (composed of the ohmic resistances and of the interfacial resistances);

these materials must be stable under the electrolysis conditions (acid medium, stability with respect to the potentials);

since the catalytic materials are generally noble and precious metals, they are therefore expensive and it is important to reduce the amounts used in order to render the PEM water electrolysis technology viable.

At the cathode, platinum is generally used for the production of hydrogen. In order to limit the amounts of platinum of the electrolyzer cores, carbon supports (powders, sheets, etc.) are used. These supports are very good electron conductors and are stable under the cathode conditions.

At the anode, as mentioned previously, the anode materials must withstand high potentials (>1.5 V/SHE).

Thus, the use of carbon-based supports cannot be envisaged since these oxidize rapidly (formation of $CO_2$). The oxides of noble metals (oxides of iridium $IrO_2$, bi-metal oxides, etc.) are predominantly used in the anodes of PEM electrolyzers since they are good electron conductors and have advantageous electrocatalytic properties with respect to the electro-oxidation of water but also a good chemical stability with respect to the high operating potentials (2 to 3 V).

Generally, these materials are therefore used as electrocatalysts and ensure the good electron conductivity of the layer (no catalyst support). Nevertheless, as they are generally dense, in order to obtain sufficient electroactive surfaces, the anode loadings of electrocatalytic materials are often very high, of the order of 2-3 mg·cm$^{-2}$. These oxides of noble and precious metals are expensive and it is essential to reduce these loadings without however affecting the electrocatalytic activity and the electron conduction of the electrode. It should be noted that below 0.5 mg·cm$^{-2}$ of anode catalysts, the electron percolation of the layer becomes difficult (too little material). This is why higher loadings are often encountered.

Much research has been carried out in order to reduce the amount of noble metals used at the anode. Mention may in particular be made of:

the production of bi- or tri-metal materials composed of elements that are less noble but stable combined with iridium or with ruthenium (Xu Wu, Jyoti Tayal, Suddhasatwa Basu, Keith Scott, *Nano-crystalline $Ru_xSn_1$-$xO_2$ powder catalysts for oxygen evolution reaction in proton exchange membrane water electrolysers*, International Journal of Hydrogen Energy, 36, no. 22, 2011, 14796-14804);

the search for catalyst support (similar to the carbon used at the cathode): this support must be chemically stable and a good electron conductor. Among the supports conventionally encountered, mention may in particular be made of:

titanium suboxide ($TiO_{2-x}$), in particular described in U.S. Pat. No. 5,173,215, "Conductive titanium suboxide particulates". Its stability has not been studied much but it reoxidizes rapidly to non-conductive $TiO_2$ at the operating potentials used in PEM water electrolysis;

ATO: antimony-doped tin oxide (Marshall, A. T., Haverkamp, R. G., Electrocatalytic activity of $IrO_2$—$RuO_2$ supported on Sb-doped $SnO_2$ nanoparticles, 2010, Electrochimica Acta, 55 (6), pp. 1978-1984).

It should be noted that since such supports are not very conductive, it is necessary to use high loadings of noble metals so as to at least 60% cover the support particles.

The encouraging results proposed by these authors are only presented for anode catalyst loadings of greater than or equal to 1 mg·cm$^{-2}$. Yet, for loadings of greater than 0.5 mg·cm$^{-2}$, the electron conduction in the anode layer is ensured and the performance changes very little with the loading; the catalyst support is not useful in those cases.

It has also been proposed, in patent US 2011/0207602 A1 (Nanometer powder catalyst and its preparation method), to use titanium oxide nanoparticles as catalyst support for applications in PEM water electrolysis. The very good performances obtained with this non-conductive catalyst support are only explained by the high loading used (1.24 mg·cm$^{-2}$ of IrO$_2$), the non-conductive TiO$_2$ particles are covered by noble metal particles.

For this loading, the support has no effect since the active layer is continuous. Thus, from the perspective of a low loading (typically less than 0.5 mg/cm$^2$), the use of these non-conductive particles is proscribed since they must ensure the electrical continuity of the active layer.

It has also been described, in the publication J. Polonsky, I. M. Petrushina, E. Christensen, K. Bouzek, C. B. Prag, J. E. T. Andersen, N. J. Bjerrum, *Tantalum carbide as a novel support material for anode electrocatalysts in polymer electrolyte membrane water electrolysers*, International Journal of Hydrogen Energy, 37, no. 3, 2012, 2173-2181, to use TiC as catalyst support for IrO$_2$. However, the Applicant has demonstrated that this type of material (TiC, TiN, etc.) is not stable under the conditions for the electrolysis of water; moreover, they do not present any durability test.

Thus, many studies have focused on the nature of the electrocatalytic species in terms of performance.

Within this context, the Applicant is also interested in the unit formed by the catalyst-loaded active layer in contact with the current collector present in the hydrogen production device, in order to improve the electrical conduction thereof.

Indeed, the anode current collector carries out the dual role of bringing water (reactant) into contact with the active layer and of discharging the gas produced (O$_2$).

It has already been proposed to manufacture the electrode directly on the porous titanium material (Wu, X., Tayal, J., Basu, S. & Scott, K., Nano-crystalline Ru$_x$Sn$_{1-x}$O$_2$ powder catalysts for oxygen evolution reaction in proton exchange membrane water electrolysers, International Journal of Hydrogen Energy, 36, 14796-14804 (2011)), the catalyst/current collector contact resistances having to be improved thereby, however due to a poor electrical contact between the current collector and the active layer with the solid electrolyte, the performance is not satisfactory.

A wealth of literature exists in the field of structuring electrodes or current collectors, this being for various fields of application. Authors have proposed in particular, in patent application US 2013/0128412, an optimized, fluted collector shape, covered by a conductive layer, which makes it possible to obtain good electronic contacts with the active layer. A particular architecture has also been proposed in patent application US 2013/0101896, for improving the electrical contacts of the external battery connectors. Conductive studs have also been produced by anodic oxidation on a current collector substrate in patent application US 2013/0101902.

Within the field of the present invention, solutions have also been proposed for improving the electrical contacts between the current collector grids and the electrodes.

For applications in lithium-ion batteries, carbon studs have been manufactured on current collector grids in order to obtain a greater contact area with the electrode (described in patent application WO 2013/61889).

Patent application US 2010/0086849 proposes to incorporate a first portion of the electrode in the current collector by acting on the choice of two particle sizes so as to obtain an improved electrical contact in the electrode/current collector unit.

These two solutions require several manufacturing steps, the first for structuring the current collector, the second for depositing the electrode. Furthermore, the solution proposed in application US 2010/0086849 is not compatible with the field of the invention; it does not make it possible to create a collector with a sufficient porosity to produce an effective current collector.

SUMMARY OF THE INVENTION

Within this context, the present invention proposes a solution that makes it possible to manufacture an anode active layer capable of adapting much more closely to the morphology of the current collector, and that thus makes it possible to improve the electrical conduction, advantageously in the case of a low degree of catalyst loading, typically of less than around 0.5 mg/cm$^2$.

More specifically, one subject of the invention is an active layer/membrane assembly intended to be incorporated into a hydrogen production device, said assembly comprising an active layer in contact with a membrane capable of exchanging ions, said active layer comprising catalyst particles and particles referred to as support particles, characterized in that the size of the support particles is greater than the thickness of said active layer, so that said support particles emerge from said active layer, at the surface opposite the surface in contact with said membrane.

According to a variant, the catalyst particles are particles based on iridium, or on iridium oxide.

According to a variant of the invention, the support particles are titanium particles.

According to a variant of the invention, the support particles have a size of greater than 1.2 micron, the thickness of the active layer being of the order of a micron.

According to a variant of the invention, the membrane is a membrane of Nafion® type.

According to a variant of the invention, the degree of catalyst loading of said active layer is less than around 0.3 mg/cm$^2$.

Another subject of the invention is a unit comprising an active layer/membrane assembly according to the invention and a current collector, said current collector having pores, with a porosity such that the support particles emerging from said active layer penetrate at the surface into the pores of said collector.

According to a variant of the invention, the porous collector is a porous titanium material.

According to a variant of the invention, the porous collector is an assembly of grids.

Another subject of the invention is a process for manufacturing an assembly according to the invention, characterized in that it comprises:

the deposition of an active layer comprising catalyst particles and particles referred to as support particles, the size of the support particles being greater than the thickness of said active layer, on said membrane;

the hydration of the membrane electrode assembly thus formed.

According to a variant of the invention, the production of said active layer comprises the production of an ink added to said membrane, said ink comprising a powder of catalyst particles and support particles, Nafion® and a mixture of water and alcohol.

According to a variant of the invention, the process comprises:
- the spraying of the ink onto a Teflon® support;
- the transfer by hot pressing onto said membrane capable of exchanging ions.

BRIEF DESCRIPTION OF THE DRAWINGS

The invention will be better understood and other advantages will appear on reading the following description, given non-limitingly, and by virtue of the appended figures, among which.

DETAILED DESCRIPTION

Within the context of the present invention, the Applicant has demonstrated the influence of adapting the surface finish of the active layer to that of the current collector. For this, the Applicant tested active layers based on iridium oxide catalyst particles and on titanium support particles. The Applicant was able to observe that the effectiveness of the electrodes was linked to the distribution of the size of the titanium support particles.

The Applicant thus discovered that when the particles are incorporated into the active layer, they prevent the reactants from accessing the catalyst while the large particles go past this active layer, and thereby make it possible to improve the electrical contacts with the current collector.

The Applicant proposes to then exploit a matching of size of support particles with a current collector capable of developing a complementarity of surface finish between the emerging catalyst support particles and said current collector.

In order to demonstrate these phenomena, the Applicant has analyzed, by SEM imaging, the surface of a porous titanium material used as current collector and the surface of an anode based on $IrO_2$ catalyst alone without titanium particles after a thousand hours of operation.

It clearly appears that the surface of the anode adapts to the morphology of the porous titanium material due to the swelling of the Nafion membrane into the pores of the current collector.

However, in view of the size of the particles of the porous titanium material (greater than 200 μm), the electrical contacts between the active layer and the porous material are not satisfactory. Indeed, the deformation of the anode active layer is limited, of the order of 10-15 μm: only 5% of the surface of the pores of the current collector is used for electrical conduction.

Figure 1:
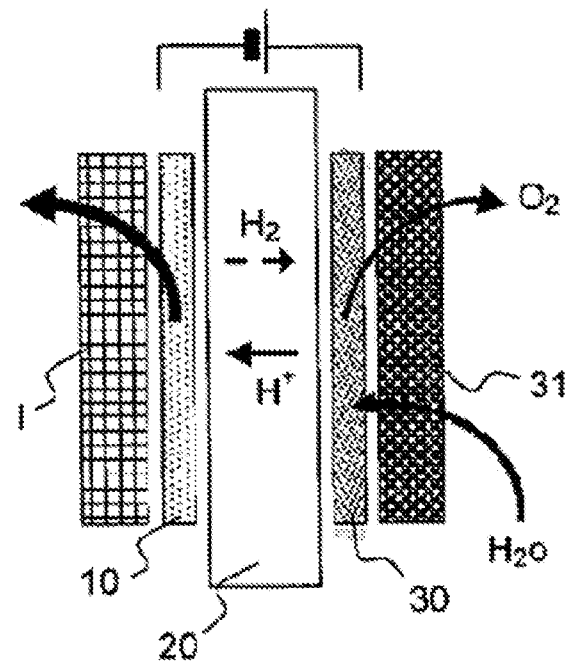
FIG. 1 illustrates a hydrogen production device according to the known art.
Figure 2:
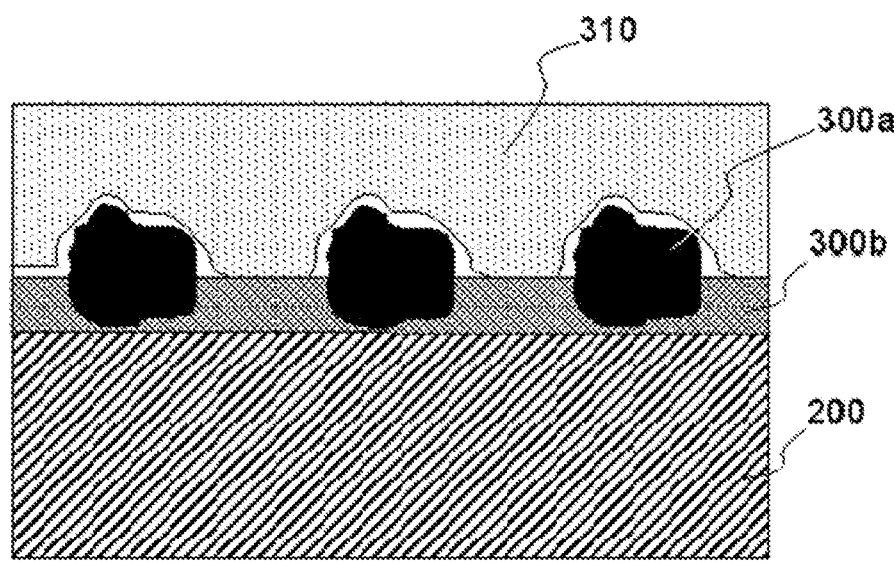
FIG. 2 illustrates an active layer/membrane assembly according to the invention.

This is why, according to the present invention, the Applicant proposes the following assembly: active layer/membrane, having a very good complementarity in terms of surface, with the current collector as illustrated in FIG. 2. The membrane 200 is in contact with the active layer, said layer containing support particles 300a of large enough size so that they can emerge from the thickness of said active layer and catalyst particles 300b of small size.

The active layer is intended to be in contact with the porous current collector 310, the particles 300a being sized in order to be partially incorporated into the pores of said current collector.

Advantageously but non-limitingly, the current collector may be a porous titanium material, it being possible for said porous titanium material to be manufactured by pressing at high temperature (sintering) of spherical titanium particles of identical sizes.

The active layer is composed of catalyst particles having a particle size which may be of the order of 10-50 nm.

The active layer also comprises titanium particles having a size typically of greater than a micron: which may be of the order of 1.2 micron to 80 μm, and which may preferably be between 1.2 μm and 10 μm.

According to the invention, it is possible to obtain good performances with a low degree of loading with expensive $IrO_2$ particles.

Indeed, since the diameters of the titanium support particles are greater than the thickness of the active layer, they may be incorporated into the porosities of the current collector. The active layer/current collector electrical contacts are improved, which reduces the cell voltage at high current density. Furthermore, these large titanium particles may act as a relay of the current collector, which makes it possible to improve the conduction in the thickness of the active layer.

On the contrary, if the diameters of the titanium particles are smaller than the thickness of the active layer, some of the titanium particles may be covered by iridium oxide. In operation, the access of the water is blocked by the titanium particles, which means that the iridium oxide particles located underneath are less active than those in contact with the current collector. The active surface is reduced and the cell voltage at low current density increases.

The Applicant carried out comparative tests for an assembly intended to be used in an electrolytic cell:
- in the case of an active layer comprising $IrO_2$ particles; and
- in the case of an active layer comprising $IrO_2$ particles and titanium support particles, according to the invention, said support particles emerging from the active layer, in order to validate the solution presented in the present application.

More specifically, the Applicant studied the change in the cell voltage as a function of the current density, this being in the precise case of a size of the iridium oxide particles of around 15 nm and a size of the titanium support particles of between 1.24 μm and 40 μm.

Figure 3:
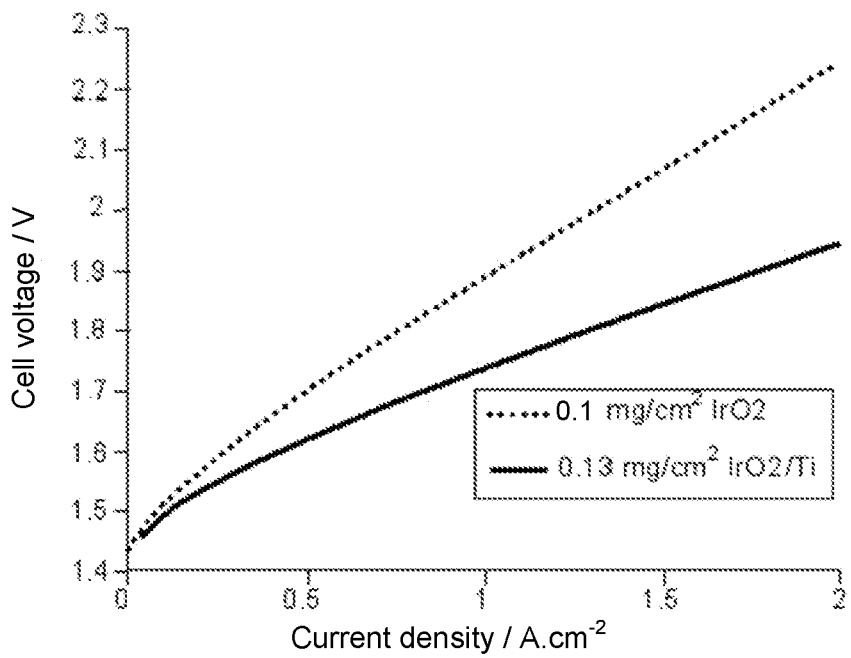
FIG. 3 shows a comparison of the cell voltages as a function of the current densities for a cell comprising an assembly with an active layer without support particles and with an active layer according to the invention (identical loadings of noble metals)

FIG. 3 shows a comparison of the polarization curves of MEAs with or without titanium particles at 80° C. More specifically, and in order to better demonstrate the effects of the addition of the catalyst support on the performance and take into account all of the MEAs tested (both with anodes of pure iridium oxide and those with the supported catalyst), the change in the cell voltage at low and high current densities was plotted on this FIG. 3 as a function of the iridium oxide loading. A lower cell voltage appears with the presence of support particles in the active layer.

Figure 4A:
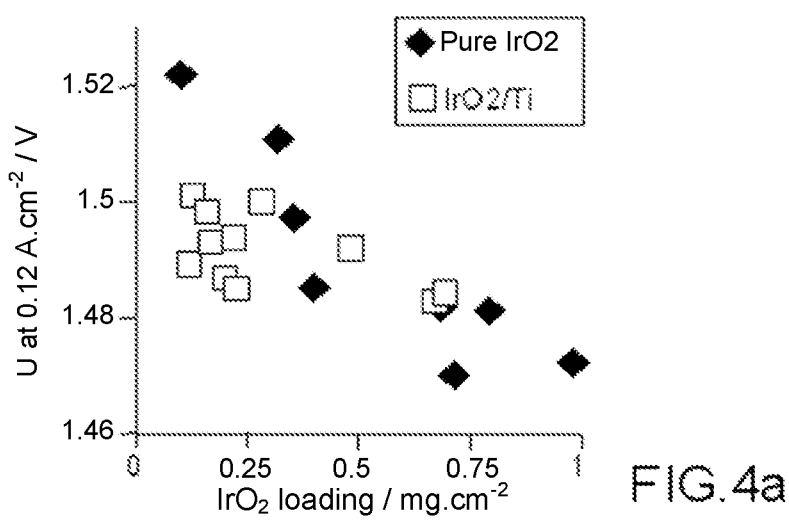
FIGS. 4a, 4b and 4c respectively illustrate the change in the cell voltage of the anodes as a function of the iridium oxide loading for current densities of 0.12 $A \cdot cm^{-2}$ and 1 $A \cdot cm^{-2}$ and the change in the ohmic resistance as a function of the iridium oxide loading at 80° C.
Figure 4B:
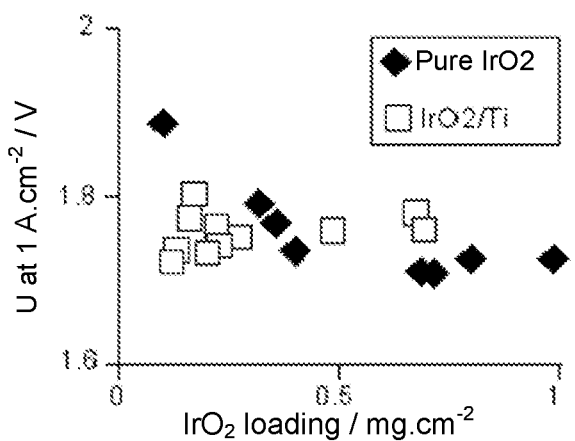
Figure 4C:
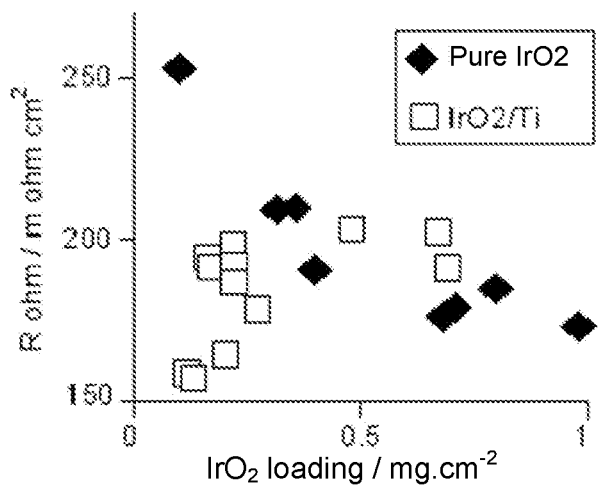

FIGS. 4a, 4b and 4c show that the addition of a catalyst support has a positive effect on the entire current density range; the cell voltage is reduced by the addition of the support:

at low current densities (FIG. 4a) for anodes having loadings of less than 0.25 mg·cm$^{-2}$ IrO$_2$ (the origin of this threshold loading is explained hereinbelow);

at high current densities (FIG. 4b) for anodes having loadings of less than 0.5 mg·cm$^{-2}$ IrO$_2$.

For low loadings below the limit threshold of 0.5 mg·cm$^{-2}$ IrO$_2$, there are not enough iridium oxide particles to obtain a continuous active layer and the contact resistance between the electrode and the current collector is high (FIG. 4c).

The titanium particles acting as conductive support material make it possible to improve the electron conduction (FIG. 4c) and therefore to reduce the cell voltage at high current density (FIG. 4b).

Furthermore, a greater number of catalyst particles may be passed through by a current which automatically increases the number of active sites available for the oxygen-generating reaction and therefore makes it possible to reduce the cell voltage at low current density (FIG. 4a).

Above this threshold value of 0.5 mg·cm$^{-2}$ IrO$_2$, the addition of titanium particles has a negative effect on the performance at high current density (FIG. 4b) which is explained by the increase in the ohmic resistance (FIG. 4c).

Figure 5A:
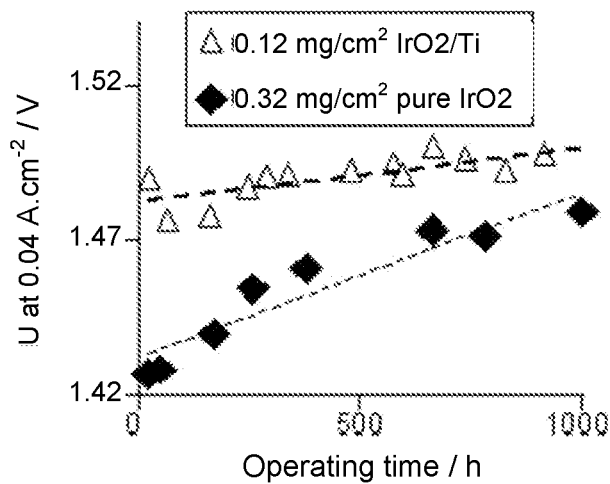
FIGS. 5a and 5b illustrate the change in the cell voltage over time for current densities of 0.04 $A \cdot cm^{-2}$ and 1 $A \cdot cm^{-2}$ and for anodes with or without titanium particles.
Figure 5B:
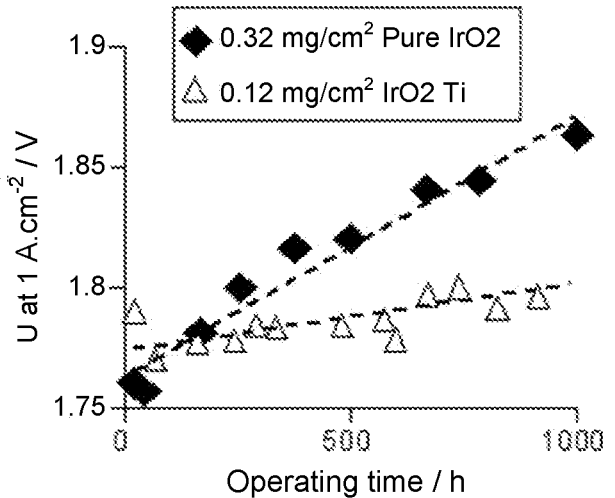

The Applicant also monitored the change in the cell voltage as a function of time for the two types of active layers tested. FIGS. 5a and 5b thus illustrate the change in the voltage over time respectively for current densities of 0.04 A·cm$^{-2}$ and 1 A·cm$^{-2}$ for anodes with or without titanium particles.

The table below then makes it possible to define the degradation slopes for current densities of 0.04 A·cm$^{-2}$ and 1 A·cm$^{-2}$ of two MEAs with or without titanium particles:

| | Current density Anode loading (mg · cm$^{-2}$ IrO$_2$) | 0.04 A · cm$^{-2}$ Degradation (V · h$^{-1}$) | 1 A · cm$^{-2}$ Degradation (V · h$^{-1}$) |
|---|---|---|---|
| Pure IrO$_2$ | 0.32 | 3.6 × 10$^{-5}$ | 11 × 10$^{-5}$ |
| IrO$_2$/Ti | 0.12 | 1 × 10$^{-5}$ | 2 × 10$^{-5}$ |

Thus, smaller slopes are advantageously obtained with an active layer of the invention.

The Applicant also made observations using an electron microscope, in order to compare said observations and the results presented above.

Selection of a Particle Size

Particular attention should be paid to the size of the titanium particles since it determines their actions within the active layer:

if the diameters of the titanium particles are greater than the thickness of the electrode, these particles jut out from the active layer and will be able to be incorporated into the porosities of the current collector. The active layer/current collector electrical contacts are improved (FIG. 4c) which reduces the cell voltage at higher current density (FIG. 4b). Furthermore, these large titanium particles act as a relay of the current collector which makes it possible to improve the conduction in the thickness of the active layer. The effect of these particles is therefore two-fold: improving the surface conduction and the volume conduction;

if the diameters of the titanium particles are smaller than the thickness of the electrode, some of the titanium particles may be covered by iridium oxide. The access of the water is blocked by the titanium particles, which means that the iridium oxide particles located underneath are less active than those in contact with the current collector; the available active surface is reduced and the cell voltage at low current density increases (FIG. 4a).

Figure 6:
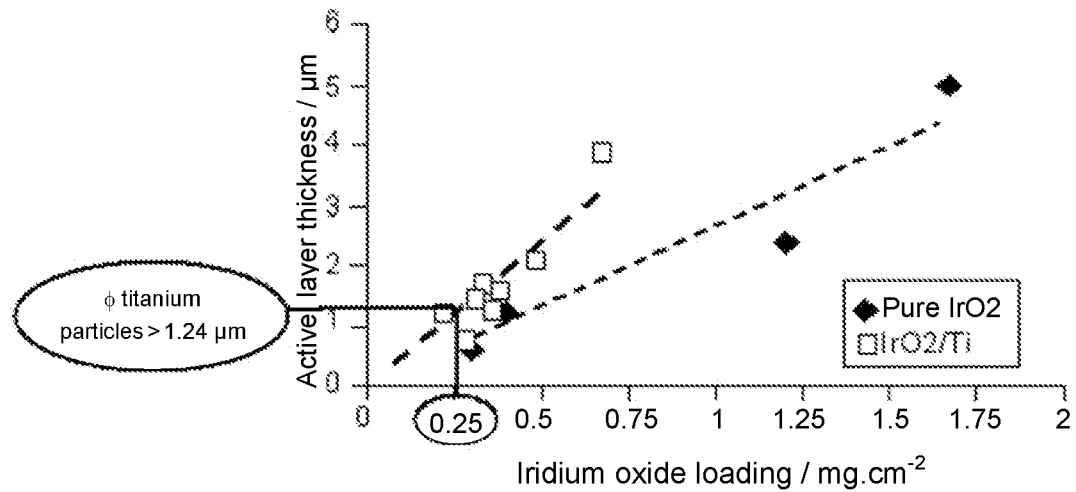
FIG. 6 illustrates the average values of the thickness of the active layer as a function of the degree of iridium oxide loading for anodes with or without titanium support particles.

The cross sections of the MEAs produced by freeze-fracture made it possible to measure the thicknesses of the anode active layers. FIG. 6 presents the average values of these thicknesses as a function of the degree of iridium oxide loading for anodes with or without titanium particles.

Particle size dispersion analyses carried out on the titanium powder showed that the diameter of the particles is greater than 1.24 μm; this makes it possible to define a threshold loading value below which the effect of the titanium particles is solely positive.

Thus, for iridium oxide loadings of less than 0.25 mg·cm$^{-2}$ IrO$_2$, the thickness of the IrO$_2$/Ti anode active layers is less than this value of 1.24 μm and all the titanium particles will jut out from the active layer and improve the surface and volume conduction of the electrode.

It is interesting to note that this loading value has already been defined above following the study of the polarization curves.

The Applicant has thus demonstrated that with an assembly according to the invention comprising an active layer with support particles of a large enough size to emerge from said active layer, optimal performances were obtained with the following advantages:

a low degree of loading with expensive catalyst particles;
a low cell voltage;
a good conductivity;
a good aging.

Indeed, the aging of the anode active layer is characterized by the agglomeration and the increase of the size of the iridium oxide particles; the electrode thus loses its porosity and becomes dense throughout its thickness. It is interesting to note that the increase in the size of the particles is greater when they are in contact with the current collector.

For anodes of pure iridium oxide having very low loading (0.32 mg/cm$^2$), the diameter of the catalyst particles may increase up to 100 nm.

Unlike the anodes of pure iridium oxide, no disparity in the increase of the size of the particles is observed for the anodes with titanium particles. The electrode has a structure that is still porous and shows that the size of the iridium oxide particles is around 25 nm; this indicates that all the particles have worked uniformly.

The titanium particles thus act as a relay of the current collector.

Figure 7A:
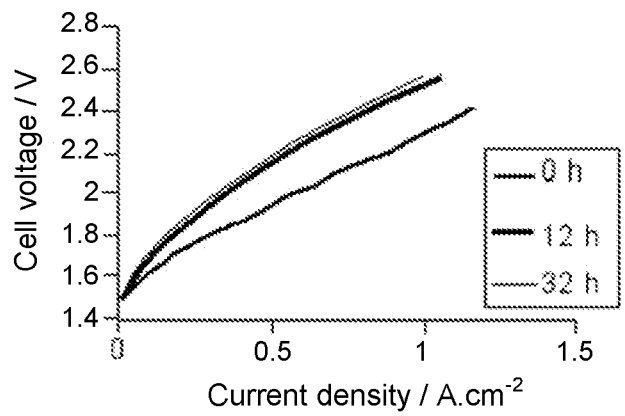
FIGS. 7a and 7b illustrate the change in the cell voltage of an MEA as a function of the current density and the change over time, respectively with an assembly produced dry and with a pre-hydrated assembly.
Figure 7B:
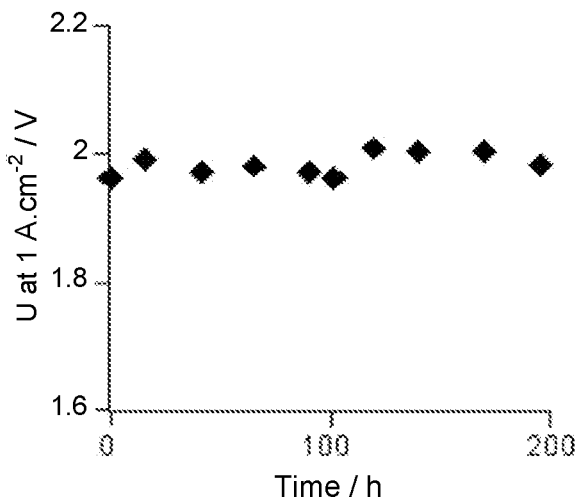

Comparison of a Non-Hydrated Assembly and a Pre-Hydrated Assembly Before Incorporation in a Cell:

FIGS. 7a and 7b relate to tests carried out on assemblies that are not pre-hydrated and that are pre-hydrated during the creation. More specifically, FIG. 7a illustrates the change in the cell voltage of an MEA assembled dry in the cell as a function of the current density with an active layer based on IrO$_2$/Ti. The cell voltage degrades rapidly over time. FIG.

7b illustrates the cell voltage at 1 A·cm$^{-2}$ of an MEA with an IrO$_2$/Ti anode after a hydration for 12 hours, showing the stability over time.

FIGS. 7a and 7b thus demonstrate the importance of pre-hydrating the membrane before assembling it in the cell. When the MEA is assembled dry in the cell, the performances degrade very rapidly after only a few hours of tests (FIG. 7a). When the MEA is assembled in the cell after having been pre-hydrated (leaving in deionized water overnight), the performances remain stable over more than 200 hours of tests (FIG. 7b).

It is important that the titanium particles can be reorganized within the volume of the active layer in order to become embedded in the porosities of the current collector so as to improve the electrical contacts. This reorganization is permitted owing to the fact that the membrane is sufficiently hydrated.

If this is not so, titanium particles are present as an overthickness under the current collector. All of the current passes through these few points and causes the oxidation of the titanium particles; this increases the total ohmic resistance of the system and the performances degrade over time.

Exemplary Embodiment of an Assembly According to the Invention:

During a first operation an ink is produced. For this, the powders of catalyst and of support particles are dispersed in a solvent of deionized water and isopropanol and 10% by weight of ionomer that may be Nafion®.

During a second operation, the ink is sprayed onto a Teflon® support and transferred by hot pressing onto a Nafion® membrane corresponding to the ion-exchange membrane.

It is thus possible to produce an anode composed of a catalytic active layer comprising iridium oxide particles and titanium particles pressed onto a Nafion® membrane, and which will advantageously be brought into contact with a porous titanium material, the current collector.

The invention claimed is:

1. An active layer/membrane assembly intended to be incorporated into a hydrogen production device, said assembly comprising:
    a collector;
    an active layer in contact with a membrane capable of exchanging ions, said active layer comprising catalyst particles;
    wherein the catalyst particles are particles based on iridium, or on iridium oxide; and
    support particles in contact with the active layer;
    wherein the support particles are titanium particles;
    wherein at least one of the support particles is large enough to be partially incorporated in said active layer so that a portion of the at least one of said support particles emerges from a surface of said active layer in contact with the collector while a remaining portion of the least one of the support particles is within said active layer, wherein a size of the at least one support particle is larger than a thickness of said active layer;
    wherein the surface of said active layer in contact with the collector is opposite to a surface of said active layer in contact with said membrane.

2. The active layer/membrane assembly as claimed in claim 1, wherein the support particles have a size of greater than 1.2 micron, the thickness of the active layer being of the order of a micron.

3. The active layer/membrane assembly as claimed in claim 1, wherein the membrane capable of exchanging ions comprises an ionomer.

4. The active layer/membrane assembly as claimed in claim 1, wherein the degree of catalyst loading of said active layer is less than around 0.3 mg/cm$^2$.

5. A unit comprising an active layer/membrane assembly as claimed in claim 1, said collector having pores with a porosity such that the support particles emerging from said active layer penetrate at the surface into the pores of said collector.

6. The unit as claimed in claim 5, wherein said collector is a porous titanium material.

7. The unit as claimed in claim 5, wherein said collector is an assembly of grids.

8. A process for manufacturing an assembly as claimed in claim 1, comprising:
    the deposition of an active layer and particles referred to as support particles onto a membrane capable of exchanging ions;
    contacting the active layer and particles with a collector on a side opposite the membrane capable of exchanging ions;
    wherein the active layer comprises catalyst particles based on iridium, or on iridium oxide;
    wherein the support particles comprise titanium particles;
    wherein at least one of the support particles is large enough to be partially incorporated in said active layer so that a portion of the at least one of said support particles emerges from a surface of said active layer in contact with the collector while a remaining portion of the least one of the support particles is within said active layer, wherein a size of the at least one support particle is larger than a thickness of said active layer.

9. The process for manufacturing an assembly as claimed in claim 8, wherein the production of said deposited active layer and particles comprises the production of an ink added to said membrane capable of exchanging ions, said ink comprising a powder of said catalyst particles and said support particles, an ionomer, and a mixture of water and alcohol.

10. The process for manufacturing an assembly as claimed in claim 9, comprising: the spraying of the ink onto a polytetrafluoroethene support; the transfer by hot pressing onto said membrane capable of exchanging ions.

* * * * *